United States Patent [19]

Best et al.

[11] 3,789,593

[45] Feb. 5, 1974

[54] HAY ROLLING MACHINE WITH PICKUP MEANS

[75] Inventors: Albert M. Best, New Holland; Robert M. Alverson, Lancaster, both of Pa.

[73] Assignee: Sperry Rand Corporation, New Holland, Pa.

[22] Filed: Dec. 7, 1972

[21] Appl. No.: 313,037

[52] U.S. Cl. .................................. 56/341, 56/16.4
[51] Int. Cl. .......................................... A01d 39/00
[58] Field of Search .................. 56/1, 16.4, 341–343

[56] References Cited
UNITED STATES PATENTS

| | | | |
|---|---|---|---|
| 3,057,139 | 10/1962 | Lane et al. | 56/8 |
| 3,587,218 | 6/1971 | Geary | 56/343 |
| 3,611,693 | 10/1971 | Geary | 56/343 |
| 3,110,145 | 11/1963 | Avery | 56/1 |
| 3,650,100 | 3/1972 | Swan | 56/341 |
| 3,680,296 | 8/1972 | Beebout | 56/16.4 |

*Primary Examiner*—Russell R. Kinsey
*Attorney, Agent, or Firm*—C. Hercus Just; Frank A. Seemar; Joseph A. Brown

[57] ABSTRACT

A hay rolling machine adapted to form rolls of hay from a swath or windrow thereof in partially cured condition while lying on a field to form a roll of hay of substanial size and weight as the machine is moved along the field by a tractor or otherwise. The machine as provided with roll pickup means respectively adjacent the forward and rearward ends of the machine and including sets of fingers respectively movable toward each other in a manner to raise a roll of hay a sufficient distance to enable the machine to move the roll of hay while the roll is suspended upon said fingers.

13 Claims, 5 Drawing Figures

HAY ROLLING MACHINE WITH PICKUP MEANS

BACKGROUND OF THE INVENTION

For many years, hay and similar farmage crops of various kinds have been harvested by cutting the crop, letting it lie in the sun upon a field to permit the same at least to partially dry and cure, forming the cut crop into windrows, picking up the windrows and feeding the same to hay balers to form compact bales of predetermined size which, in general, are of such weight that they can be handled manually. The bales then are either hauled to storage sheds or barns to store the hay in relatively weatherproof conditions until used. Such operations require a substantial amount of manpower which is becoming increasingly scarce and, correspondingly costly in farming operations at present.

Particularly to minimize the amount of manpower required for having operations of the type described above, there has recently been developed a hay harvesting technique in which either a swath or windrow of hay is engaged by suitable machines which roll a strip or swath of such hay of substantial width into a coiled roll of the order, for example, of about 6 feet in width and approximately 4 feet in diameter. A roll of hay of this size may weigh as much as one ton and thus is far too heavy for manual handling. Accordingly, while it is possible to move rolls of such size by power equipment to any desired location, it also has been found convenient to let rolls of hay of such type as described remain in a grazing field or feed lot under conditions where cattle may gradually feed upon the same. In view of the curved, upper surface of such bales, it has been found they shed rain quite readily so that deterioration does not occur unduly even when remaining in a field over a substantial period of time and in uncovered condition.

In undertaking the harvesting of hay by the techniques described above, one problem encountered has been the occurrence of situations where, for example, large ruts, gullies, or other types of channels occur in a hay field and offer substantial difficulties to continuous rolling of a roll of hay, particularly if the width and depth of such aforementioned formation in a field is sufficient to hold the roll of hay in a manner to pervent continued roation thereof. Under such circumstances, it is conceivable that rolls of hay of certain diameters, if lodged in crevices and the like in a field, can cause substantial damage to the hay rolling machine unless the movement of the machine is stopped immediately upon discovering the roll of hay to be lodged in the manner referred to above. Should the foregoing occur, and assuming that no damage is sustained by the machine, the roll will have been removed from the machine and it is necessary to suitably retrieve the roll, as well as initiate the rolling of a new roll by the machine.

In addition to hay fields having irregular surfaces therein of the type referred to above, it also has been found that it would be highly convenient to move heavy rolls of hay of the type referred to various distances, some of which even may be short distances, for example, so as to place the roll in a desired feed lot or appropriate location in a grazing field, without requiring the use of auxiliary power equipment such as hoists or other means which, in accordance with present practice, is necessary to be used in order to handle rolls of hay of the sizes and weights referred to above.

At present, there are relatively complex and correspondingly expensive rotary hay balers which have been developed and comprise the subject matter of certain prior patents. Among these, for example, are the balers shown in U.S. Pat. Nos. 2,336,491, issued Dec. 14, 1943 to U. F. Luebben, and No. 2,581,542, issued Jan. 8, 1952, to H. Kolzing. Balers of the type illustrated in these patents elevate a windrow or swath of hay and the like from a field, by means of conveyors, to various types of belt and chain mechanism which progressively encircle a roll of hay of increasing size and support the roll while being formed completely within the machine, rather than have the same roll along a hay field as it is being formed. Obviously, rolls of hay can be transported by machines of the types illustrated in the aforementioned patents. Machines of that type however, in general, are too expensive for farmers who operate, in particular, with relatively small size herds of cattle such as those numbering less than 100.

Under the foregoing circumstances, it will be seen that hay balers of the type which form rolls of hay by rolling the same along a field may be manufactured at far less cost than the complex, expensive types of machines referred to above and illustrated in said aforementioned patents. Moreover, there is a need for the more simple type of balers to have bale pickup means suitable to elevate a relatively heavy roll of hay at least a short distance above the surface of a field or roadway in order to transport a roll of hay certain distances or, if necessary, simply to support the roll out of contact with a field surface such as when the machine is passing over a washout, gully, or other crevice on a hay field which might offer obstruction to the continued rolling of a roll of hay. It is for purposes of satisfying the foregoing need for such pickup means that the present invention has been developed, details of which are described hereinafter.

SUMMARY OF THE INVENTION

It is the principle of the present invention to provide a relatively simple hay rolling machine which is durable and capable of rolling rolls of hay of substantial size and weight, while being capable of being manufactured and sold at reasonable prices so that farmers operating relatively small herds of cattle can economically afford and utilize such a hay baler, such machine also being provided with relatively simple and rugger roll pickup means operable preferably by powered mechanism to elevate a formed roll of hay at least a short distance above the surface of a field or a roadway and thus support the roll for movement while out of contact with the surface over which the machine is moving.

It is another object of the invention to provide such hay rolling machine with roll pickup means utilizing sets of tong-like fingers, at least one set thereof being movable toward the other set when it is desired to pickup a roll of hay and thus engage the roll at circumferentially spaced locations in a camming manner which requires limited power such as is readily available upon most farm tractors in use at present.

It is a further object of the invention to arrange the aforementioned tong-like fingers so that a forward set thereof in the machine extend downwardly and rearwardly, and preferably are angularly adjustable with respect to the surface over which the machine moves, and a rearwardly mounted set of fingers which extend downwardly and at least the lower portions thereof extend downwardly and forwardly toward the forwardly mounted set of fingers.

Still another object of the invention is to provide a hay rolling machine of the type referred to which includes hay rolling mechanism adapted to pickup and roll a swath or windrow of hay to form the same into a coiled roll, such mechanism being mounted preferably adjacent the rearward end of the hay rolling machine and the aforementioned rearwardly mounted set of fingers being positioned adjacent said hay pickup and rolling mechanism during the rolling operation of the machine but the lower ends of said rearwardly mounted fingers being movable forwardly, toward the forwardly mounted fingers when a roll of hay is to be picked up by said fingers.

One further object of the invention is to provide an auxiliary frame which is pivotally mounted at its upper end on upwardly extending side frame members on the base frame of the machine and said rearwardly mounted fingers being supported by said auxiliary frame means for rearward and upward pivotal movement thereof with said auxiliary frame means when a formed roll of hay is to be discharged from the open rearward end of the base frame of the machine.

Still another object of the invention is to provide fluid operated power means on said aforementioned auxiliary frame means and interconnected to said rearwardly mounted fingers and operable to simultaneously move all of said fingers about the axis of the upper pivoted ends thereof so as to move the lower ends of said fingers in relatively close proximity to the surface of a field and engage the lower rearward circumferential surface of a roll of hay being formed and thereby urge the same toward and onto said downwardly and rearwardly extending forwardly mounted fingers sufficiently to elevate the roll of hay out of contact with the field surface.

Details of the foregoing objects and of the invention, as well as other objects thereof, are set forth in the following specification and illustrated in the accompanying drawings comprising a part thereof.

DETAILED DESCRIPTION

Figure 4:
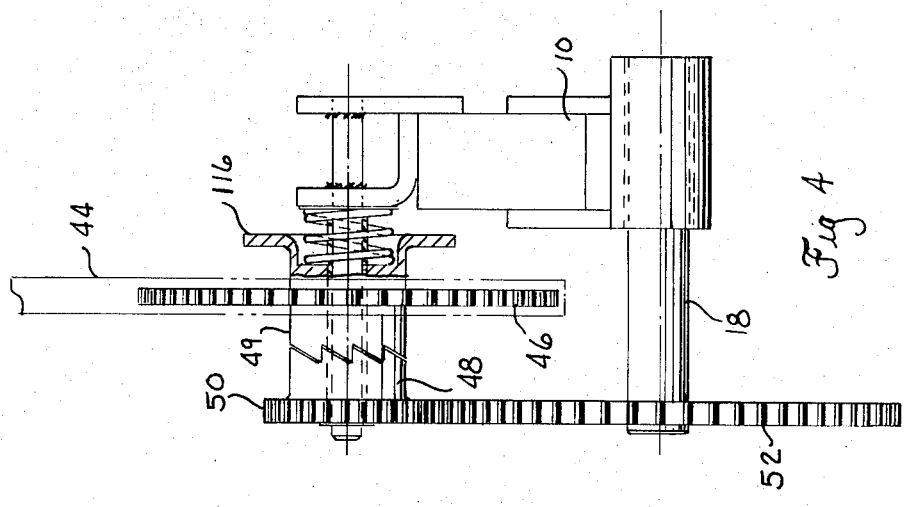
FIG. 4 is a fragmentary vertical elevation, partly in section, showing details of one of the clutch mechanisms shown in FIG. 3.

The hay rolling machine comprising the present invention includes a base frame 10 which is formed from suitable structural channels or the like in accordance with conventional design for machines of this type. The forward end of the machine has a tongue 12 including a clevis 14 for connection thereof to a tractor or the like. As shown in FIG. 4, at opposite sides of the machine, a pair of wheels 16 are rotatably supported upon suitable axles. Auxiliary frame members 20 and 22 respectively extend upwardly from the sides of base frame 10 and are connected thereto at longitudinally spaced locations, the upper ends of members 20 and 22 being connected together to provide a bearing 24 to receive opposite ends of an upper shaft 26. Thus, it will be seen that the members 20 and 22 at each side of the frame 10 are somewhat A-shaped to provide effective bracing for support of the shaft 26 and the mechanism supported thereby as described hereinafter. Members 20 and 22 may, for example, be in the form of structural channels or otherwise.

Figure 1:
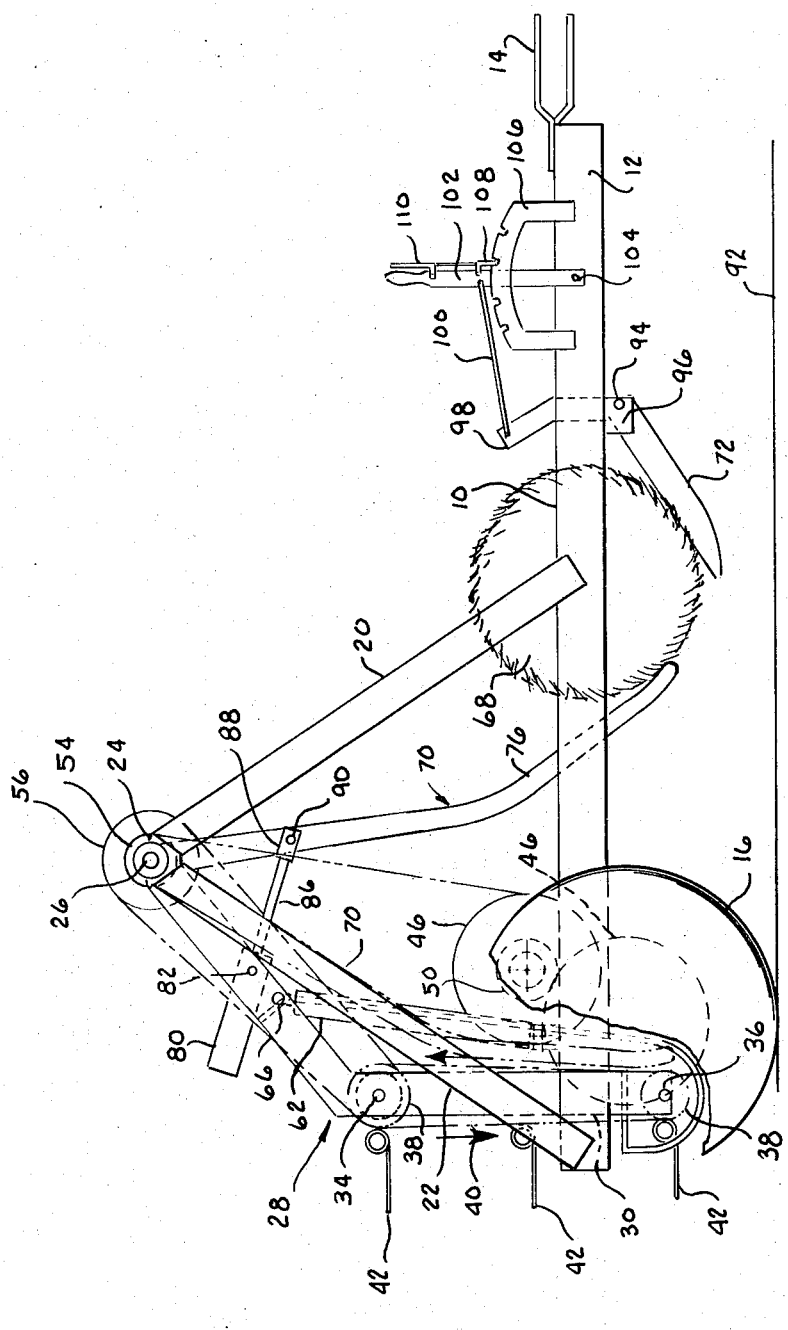
FIG. 1 is a side elevation of a hay rolling machine embodying the principles of the present invention and, in full lines, showing roll elevating means of the invention in engagement with a roll of hay, while in dotted line, certain of said roll engaging members being illustrated in idle position.
Figure 2:
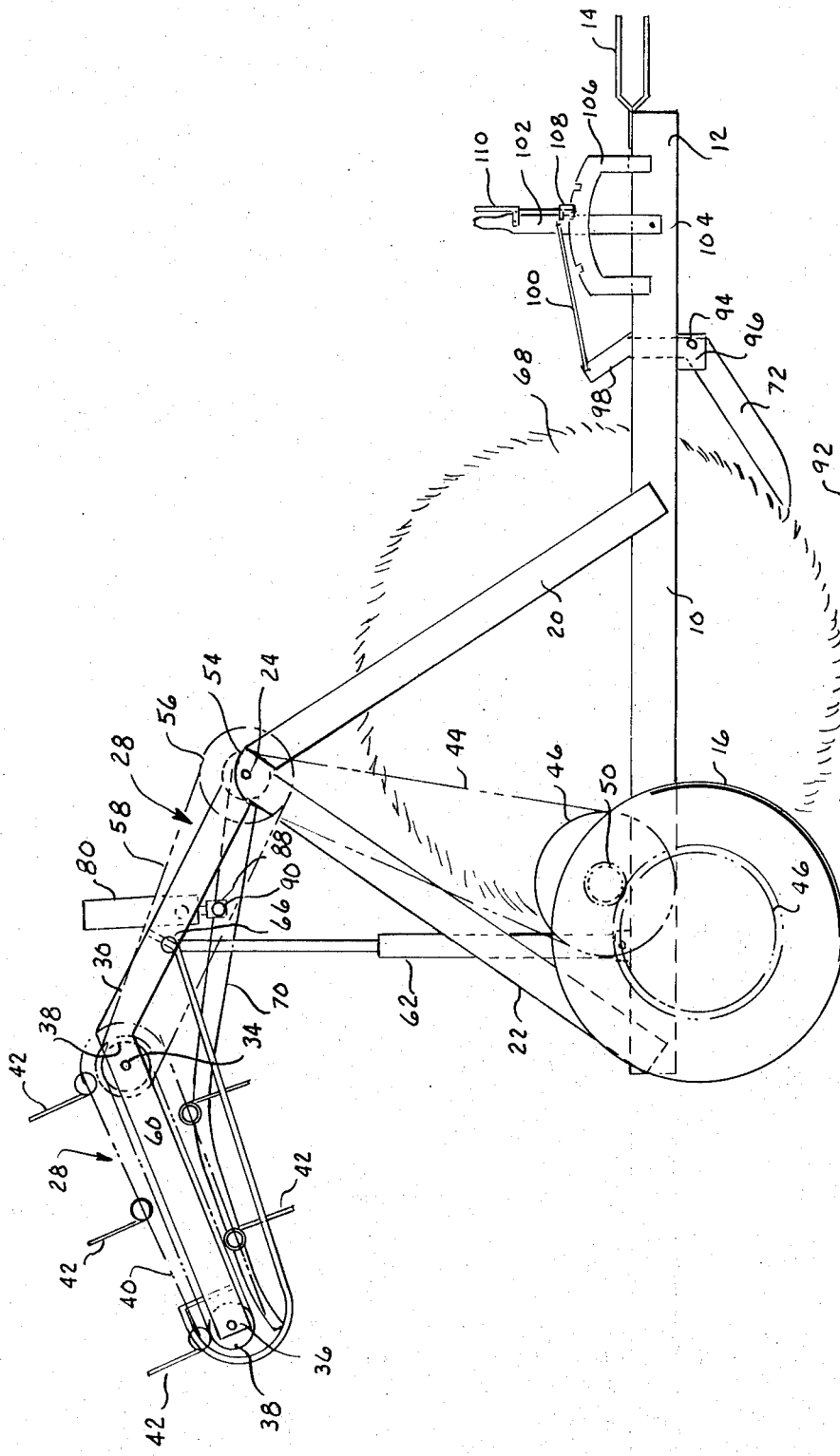
FIG. 2 is a view similar to FIG. 1 showing the hay rolling machine disposed in roll discharge position, an exemplary completed roll of hay being illustrated in said figure in position to be discharged from the machine.
Figure 3:
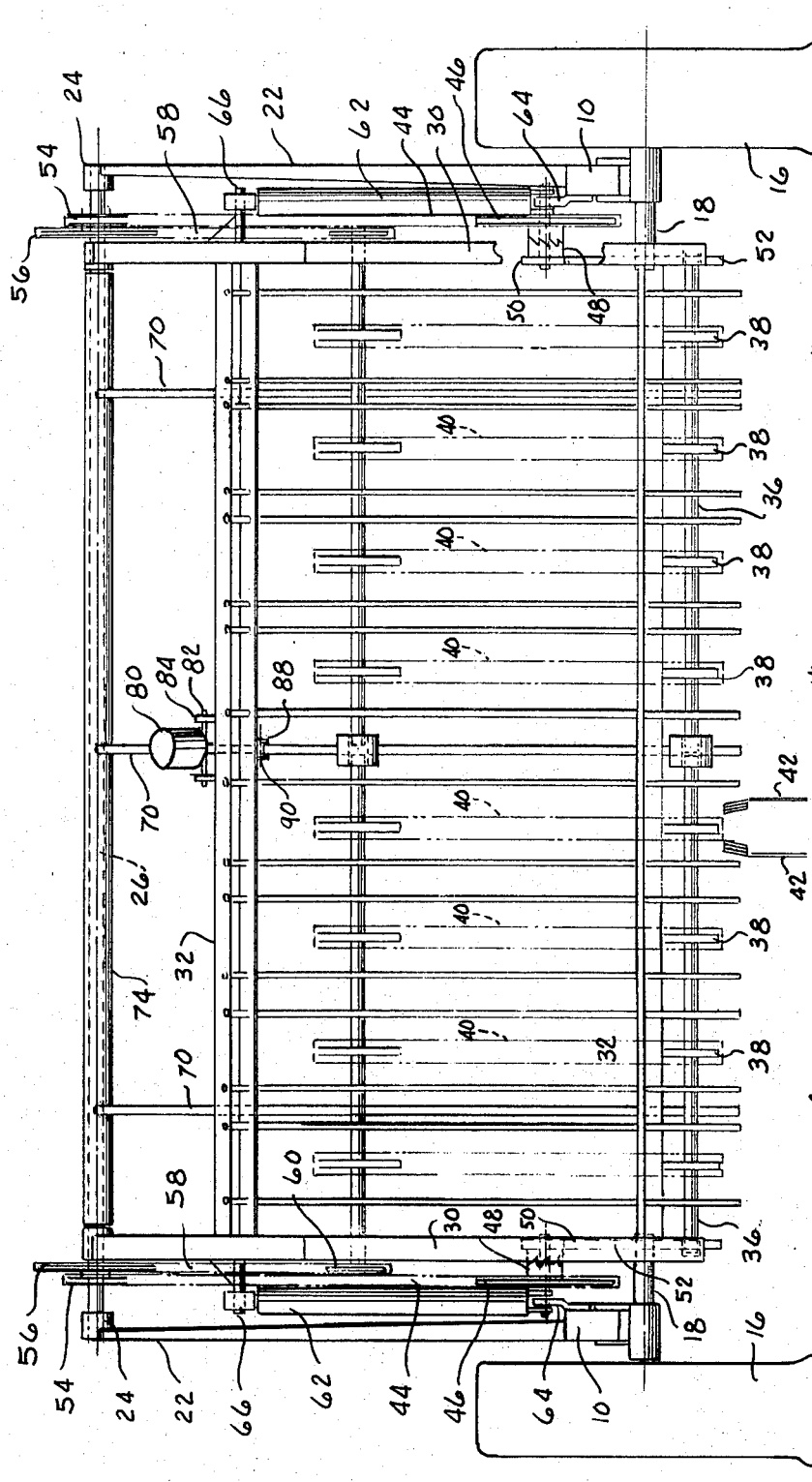
FIG. 3 is a rear elevation of the machine shown in FIGS. 1 and 2 as seen from the discharge end thereof.

A hay pickup unit 28 is supported by shaft 26 for movement between a lower, operative position as shown in FIGS. 1 and 2, and a raised, discharge position as shown in FIG. 3. In view of the fact that the hay pickup unit 28 comprises part of the invention described and claimed in said aforementioned companion application, only certain functions and details thereof are described and claimed in this application, as follows.

Hay pickup unit 28 comprises a pair of angular side members 30, the upper ends of which are pivotally supported by the shaft 26. A plurality of strut members 32 extend between members 30 to brace the same for the support of a pair of parallel shafts 34 and 36 which respectively support pairs of sprocket gears 38, one of which in each pair is an idler and the other is driven. The pairs of upper and lower sprocket gears support endless sprocket chains 40 upon which a plurality of spring fingers 42 are mounted in longitudinally spaced relationship to each other.

The sprocket chains 40 are driven in the direction of the arrows shown in FIG. 1 by a pair of drive chains 44 respectively shown best in FIG. 3 at opposite sides of the machine. The drive chains extend around sprocket gears 46 which are shown in FIGS. 3 and 4. By means of clutches 48, the gears 46 are connected to pinion gears 50 which are driven by drive gears 52 connected to the axles 18 for wheels 16, whereby said wheels drive the sprocket gears 46. Drive chains 44 extend around the sprocket gears 46 and also around drive sprockets 54 on shaft 26.

Drive sprockets 54 also are fixed to larger diameter sprockets 56 which are coaxial with shaft 26 and around which drive chains 58 extend for purposes of driving sprocket gears 60, around which the chains 58 also extend. Gears 60 are connected to shaft 34 upon which the upper sprocket gears 38 are mounted to drive the sprocket chains 40 which extend therearound and by which the spring fingers are moved in the direction of the arrows referred to above in FIG. 2, at about 5 percent faster than ground speed.

Respectively provided at opposite sides of the frame 10 are each of a pair of hydraulic cylinder and piston units 62. One end of the cylinder of said units are connected to brackets 64, see FIG. 4, and the upper ends of the pistons are connected to the side members 30 of the hay pickup unit 28 by pivot pins 66, as shown in FIGS. 2–4. Suitable conduits for hydraulic fluid, not shown, are connected to opposite ends of the cylinders 62 to direct fluid under pressure, from the tractor or the like, for actuation of the piston of the unit and thereby move the hay pickup unit 28 between its lowered operative position, shown in FIGS. 1 and 2, and its raised discharged position shown in FIG. 3.

The present invention primarily is concerned with roll pickup or elevating means by which rolls of hay 68 or the like, of substantial size and weight, are capable of being picked up by the machine comprising the present invention either for momentary periods of time or for purposes of carrying the rolls either along a field or roadway for substantial distances. Having in mind that bales of the type referred to frequently weigh as much as 1 ton and are of the order of 6 feet long and 4 feet in diameter, durable and rugged means are necessary to accomplish such pickup and or transporting functions. The present invention provides suitable means for such purposes, details of which are as follows.

It is to be understood that while the present description refers to the principle product being dealt with as hay, it is to be understood that other agricultural products and especially those employed in the cattle and dairy industry are intended to be encompassed within the invention. Therefore, other products such as straw and forage crops other than conventional hay are capable of being handled with the machine embodying the principles of the present invention.

The hay roll pickup and elevating means comprise sets of cooperating fingers 70 and 72. These are best shown in side elevation in FIG. 1. The fingers 70 are substantially longer than 72. Referring to FIG. 3, it will be seen that in accordance with the preferred construction of the present invention, there are a plurality of the fingers 70, three of the same being selected for the exemplary illustration shown in FIG. 3. Said exact number is not to be considered restrictive however in as much as other numbers thereof may be utilized. The fingers preferably are transversely spaced apart suitably to provide effective engagement with a roll 68 of hay or the like.

The fingers 70, as can be seen from FIGS. 1 and 2, are of appreciable length and, in general, extend downwardly from and are connected to elongated tubular bearing sleeve 74 which is pivotally supported by the transversely extending shaft 26 supported at its opposited ends by bearings 24. The upper ends of the fingers 70 may be secured to bearing sleeve 74 by any suitable means such as welding or otherwise. It also will be seen from FIGS. 1 and 2 the fingers 70 have a lower portion 76 which is disposed at a wide angle with respect to the relatively straight upper portion 78, whereby the fingers 70 are somewhat hook-shaped.

The fingers 70 also are at least somewhat connected to the auxiliary frame which supports the hay pickup unit 28, said frame comprising the angular side members 30 which are connected together by transversely extending strut members 32 which are best shown in FIG. 3. This is because the auxiliary frame also is pivotally supported at its upper end by the transversely extending shaft 26. Further, the actuation of the fingers 70, as described hereinafter, depends upon said auxiliary frame to support preferably fluid-actuated cylinder and piston means 80 which are best shown in FIGS. 1 and 3. The cylinder 80 preferably has a pair of trunnions 82 which are received respectively in bearing ears 84 which are supported by one of the transverse strut members 32 as clearly shown in FIG. 3.

The piston rod 86 is provided on its outer end with a clevis 88 which embraces the central finger 70 intermediately of the ends of the straight upper portion 78 thereof and an appropriate pin 90 extends between the clevis and said finger to pivotally connect the piston rod 86 to said finger. In view of the fact that all of the fingers 70 are integrally connected to the bearing sleeve 74, actuation of the central finger 70 will correspondingly actuate all of the other fingers 70 simultaneously therewith.

Normally, as when a roll 68 of hay is being formed, such as by rolling the same along the surface 92 of a field, the fingers 70 are maintained in the dotted line position thereof shown in FIG. 1, which is regarded as the idle position thereof. It will be understood that the cylinder 80 is connected to suitable hydralic means comprising a pump and the like, not shown, which normally is carried by tractors of currently used types to propel agricultural machines of the kind with which the present invention is concerned, whereby conventional conduits, control valves and the like need not be illustrated relative to cylinder 80 and it can be assumed that the same hydraulic source that is connected to cylinder 62 also is connected to cylinder 80. Said hydralic means normally maintains the fingers 70 in said idle or retracted position, as shown in dotted lines in FIG. 1.

It also will be understood that, preferably, a plurality of transversely spaced fingers 72 are provided. These, for example, are mounted upon a suitable shaft 94 supported by an appropriate bracket 96 which may be connected to the tongue 12 of the frame 10 for example. Normally, the fingers 72 are considered to be the forwardly-mounted fingers and in substantially all operative positions thereof, the same extend downwardly and rearwardly from the supporting shaft 94. In general, the lower ends of the fingers 72 extend relatively close to the surface of a field 92 over which the machine is traveling but due to the rearwardly extending feature thereof, they offer no impedance in the event irregularities in the field are encountered thereby.

The position of the fingers 72 with respect to the frame 10 also preferably is adjustable at least through a limited arc. This is accomplished by providing an upwardly extending arm 98 which is connected at its lower end to shaft 94. The upper end of arm 98 is pivotally connected to one end of a link 100. The opposite end of the link is connected to a preferably manually operable adjusting lever 102 which extends upward from a pivotal connection 104 of said lever with respect to tongue 12. An adjustment-maintaining segment 106 of conventional type may be employed for association with a latching detent 108, which is operated by supplemental handle 110 of conventional type.

The purpose for having the fingers 72 angularly adjustable with respect to frame 10 is to render the pickup means of the present invention readily adaptable to accommodate roll 68 of hay and the like of various diameters. For example, if it is desired to pick up rolls of relatively small diameters, the terminal ends of the fingers 72 should be disposed closer to the field surface 92 than when rolls 68 of larger diameter are to be picked up.

In operation of the hay rolling machine and pickup means therefor in accordance with the present invention, the machine is moved along a field upon which windrows or swaths of semicured hay lie. The machine moves toward the right, as viewed in FIGS. 1 and 2 and is drawn by a tractor or otherwise, as indicated above. The hay pickup unit 28 is operated by the chains 40 and spring fingers 42 moving in the direction of the arrows shown in FIG. 1. This causes the swaths or windrows of hay to be coiled clockwise. The drive for said chains 40 by the wheels 16, through the clutch units 48, as described above, preferably is such that the speed of the chains is approximately 5 percent faster than the ground speed of the hay rolling machine. This insures a certain tensioning of the outermost layer of the hay as it is applied to the previously coiled portion thereof. Accordingly, the roll of hay builds up forwardly of the hay pickup unit 28 and rearwardly of the fingers 72. While this is occuring, the fingers 70, which are the rearwardly mounted set of fingers, are disposed in the idle, dotted line positions shown in FIG. 1, in which they're disposed between certain courses of the chains 40, as can be seen from FIG. 3. If, however, during the course of the formation of the roll 68, a rut, gully, ditch, or otherwise occurs in the field surface 92, and particularly one of such size that the roll either completely or to a large extent falls there into, upon seeing such recess in the surface 92 ahead as the tractor driver moves along the field, the powered means comprising cylinder unit 80 may be quickly energized to move the fingers 70 simultaneously forwardly, the lower ends of which engage the roll 68 and push it forwardly onto the rearwardly extending fingers 72 and thereby elevate the roll above the field surface 92, whereby there is no danger of the roll falling into such crevice or otherwise. Immediately upon such crevice or cavity having been passed, the fingers 70 are instantly retracted to idle position, whereupon the roll 68 is deposited upon the field surface 92 and is substantially immediately contacted by the moving fingers 42 of the pickup unit 28, thus resuming the coiling.

Under circumstances where it is desired to move either a partially completed or a large roll of hay 68 of desired size is to be moved to another location either in the same field or otherwise, or along a roadway, the cylinder 80 is actuated to cause the fingers 70 to elevate the roll 68 above the surface 92 such as by moving it forwardly onto the rearwardly extending fingers 72. Thus, by maintaining pressure upon the cylinder 80, ample support for the roll 68 is provided for such movement of the same to a newly desired location without requiring the use of any auxiliary equipment, hoisting mechanism or otherwise.

From FIG. 2, it also will be seen that the auxiliary frame comprising the pickup unit 28, by means of the fluid actuated cylinder unit 80, is connected to the forwardly mounted fingers 70. Accordingly, when a roll of hay 68 has been formed to a desired diameter and is resting upon the field surface 90, the same may be discharged from the open rear end of the hay rolling machine by elevating the auxiliary frame which carrys the pickup unit 28 and to which the fingers 70 also are connected as a unit. Such elevated position is shown in FIG. 2. It will thus be seen that all elements upon said auxiliary frame are at a sufficient elevation that they will not encounter even a relatively large diameter roll of hay 68 as the machine moves forwardly and leaves the roll 68 resting upon the field 90.

Figure 5:
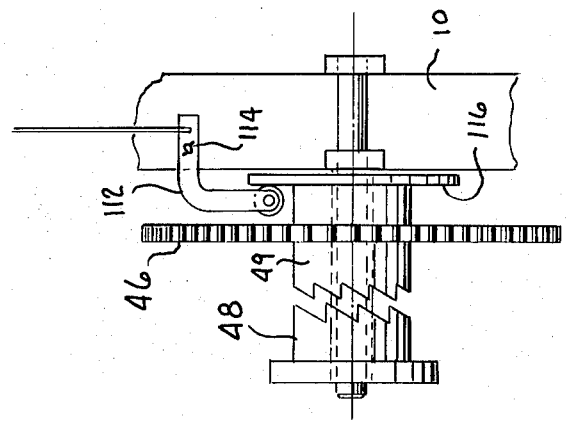
FIG. 5 is a fragmentary top plan view of a portion of the clutch mechanism shown in FIG. 4.

It is preferred that during such discharge of the roll 68 from the machine that operation of the hay pickup unit 28 be suspended and is accomplished by disengaging the clutch units 48. Such disengagement is effected by relatively simple means comprising a pivoted dog 112 which is shown in plan view in FIG. 5 as being connected by a pivot pin 114 to the adjacent side member of frame 10. It will be understood that each side of the frame has one of the dogs 112 connected thereto for engagment with a flange 116 which is provided on axially moved clutch member 49 as shown in FIGS. 4 and 5.

The clutch dogs 112 are operated by suitable pull cords or cables 117 which extend forwardly to a suitable location where they may be operated by the driver of the tractor, for example, not shown, such arrangement being of conventional nature.

Another feature of the present invention which is advantageous comprises the angular shape of the side members 30 of the auxiliary frame. It will be seen that the pivoted end portions thereof are disposed at a wide or obtuse angle with respect to the outer end portions thereof, somewhat resembling a so-called dog-leg. In view of said shape, it will be seen that especially when the pickup unit 28 and the fingers 70 are in elevated position as shown in FIG. 2, all portions of the same are positioned to clear a roll of hay 68 of even very substantial diameters such as of the order of about 4 feet. However, when the pickup unit is in operative position, such as shown in FIG. 1, the opposite courses of the conveyors chains 40 are substantially vertical, whereby they are in position for the fingers 42 thereof to have maximum efficiency incedent to rolling the continously engaged windrow or swath of hay and the like in order to coil the same into a roll 68.

From the foregoing, it will be seen that the present invention provides relatively simple, rugged and durable pickup means for a hay baler of the type which forms rolls of hay and other similar agricultural products. Not withstanding the fact that the rolls thus formed are of very substantial size and appreciable weight, such as of the order of as much as one ton, the tong-like fingers 70 and 72 cooperated to effectively raise rolls of various diameters from contact with the field surface, either for momentary duration or for longer periods, and then are operable to restore the roll to rolling condition upon a field suface, if desired. The mechanism to operated the movable fingers 70 is simple but adequate and effective by employing fluid-operated cylinder unit means controlled by the driver of the tractor which propels the machine along the field. The forwardly mounted but rearwardly extending fingers 72 also are adjustable to render the same effective for use with rolls of different diameters and thereby increase the efficiency and effectiveness of the machine.

While the invention has been described and illustrated in its several preferred embodiments, it should be understood that the invention is not to be limited to the precise details herein illustrated and described since the same may be carried out in other ways falling within the scope of the invention as illustrated and described.

We claim:

1. A machine to form rolls of hay and the like from a swath or windrow thereof lying in a field and comprising in combination, a base frame, wheels mounted at opposite sides of said frame to render the same mobile to move along a field, hay pickup and rolling means on said frame adjacent the normally rear end thereof movably supported and engagable with the leading end of a swath or windrow of partially cured hay and the like and operable to roll the same along a field surface in the direction of movement of the machine to form a coreless coiled roll of said hay and the like, and roll pickup means carried by said frame comprising a plurality of elements movable toward each other to engage a roll of hay of predetermined size at circumferentially spaced locations below the axis thereof and thereby raise the same above the surface of a field a sufficient distance to clear the field and permit transportation of the roll to a desired location by said machine.

2. The hay rolling machine according to claim 1 in which said cooperative lifting means are tong-like.

3. The hay rolling machine according to claim 2 in which one of said lifting elements is adjacent the forward end of the machine and the other is adjacent the rearward end thereof.

4. The hay rolling machine according to claim 1 in which said roll pickup means comprise a set of transversely spaced fingers mounted forwardly in said frame and a set of transversely spaced fingers mounted rearwardly in said frame, one of said sets being movable toward the other to raise said roll of hay as aforesaid.

5. The hay rolling machine according to claim 4 in which said forwardly mounted set of fingers extend downward and rearward and said rearwardly mounted set extend downward and at least the lowermost portions thereof extend forwardly.

6. The hay rolling machine according to claim 5 in which said forwardly mounted set of fingers are fixed to a transverse shaft on said frame, and said machine further including means to adjust the angle at which said set of fingers extend relative to the surface of a field upon which hay is being rolled to facilitate the picking up of rolls of various diameters efficiently.

7. The hay rolling machine according to claim 5 firtjer including side frame members extending upwardly from opposite sides of said base frame, and a shaft extending across said machine between the upper portions of said side frame members, said rearwardly mounted fingers being supported at one end by said shaft and extending downward therefrom and adapted to be moved pivotally upon the axis of said shaft to move the lower portions of said fingers forwardly to engage a roll of hay and roll the same onto said downward and rearwardly extending forwardly mounted fingers to elevate said roll sufficiently at least to be clear of the field.

8. The hay rolling machine according to claim 7 further including power means interconnected to said rearwardly mounted fingers and operable to move the same simultaneously between rearward idle position and forward operative position to elevate a roll of hay as aforesaid.

9. The hay rolling machine according to claim 8 further including supporting means rotatable upon said shaft and said rearwardly mounted fingers being commonly connected thereto, and said power means comprising a fluid operated cylinder and piston unit interconnected commonly to said fingers to operate the same simultaneously.

10. The hay rolling machine according to claim 4 further including side frame members extending upwardly from opposite sides of said base frame, auxiliary frame means extending downwardly from the upper portions of said side frame members and pivotally movable rearwardly relative thereto, said rearwardly mounted fingers being movable pivotally about and extending downward from transverse axis extending between the upper portions of said side frame members and power means connected between said fingers and said auxiliary frame means and operable to move the lower ends of said fingers toward said forwardly mounted fingers to raise a roll of hay above the surface of a field as aforesaid.

11. The hay rolling machine according to claim 10 in which said base frame is open at the rear end and said auxiliary frame means comprises a pair of similar frame members pivotally interconnected at the upper ends thereto to the upper portions of said side frame members, and cross members extending therebetween to space said similar frame members together, said hay pickup and rolling means being supported by said auxiliary frame means, and additional power means at opposite sides of said machine and connected to said auxiliary frame means and operable to pivotally elevate the same upwardly and rearwardly adequately to raise said hay rolling means and rearwardly mounted fingers supported thereby to a discharge position to clear a roll of hay when the diameter thereof has increased to a desired extent and is to be discharged through the open rear end of said base frame.

12. The hay rolling machine according to claim 11 in which said similar frame members of said auxiliary frame are each angular in shape and comprise normally upper and lower sections disposed at a wide angle to each other and having the apex thereof extending rearwardly, whereby when said frame is raised to discharge position, the upper sections of said members extend upwardly and rearwardly to dispose said hay pickup and rolling means and rearward fingers substantially horizontal and thus adequately clear the roll of hay being discharged.

13. The hay rolling machine according to claim 11 further including drive means for said hay pickup and rolling means connected to at least one of said wheels on said base frame to drive the same when said machine is moved along a field, and clutch means included interconnected between said hay pickup and rolling means and said wheel, said clutch means being operable to disconnect the same and thereby render said hay pickup and rolling means idle when said auxiliary frame is elevated to permit discharge of a roll of hay thereeath.

* * * * *